United States Patent [19]

Tranberg et al.

[11] 4,226,454

[45] Oct. 7, 1980

[54] LOCK FOLLOWER, PARTICULARLY A HANDLE OR PRESSURE FOLLOWER, AND A METHOD OF MANUFACTURING THE SAME

[75] Inventors: Erik R. Tranberg, Eskilstuna; Bo G. Widén, Torshälla, both of Sweden

[73] Assignee: GKN-Stenman AB, Eskilstuna, Sweden

[21] Appl. No.: 884,444

[22] Filed: Mar. 7, 1978

[30] Foreign Application Priority Data

Mar. 8, 1977 [SE] Sweden ............ 7702601

[51] Int. Cl.$^2$ ............ E05B 3/08; F16B 7/00

[52] U.S. Cl. ............ 292/336.5; 70/380; 403/282; 403/359

[58] Field of Search ............ 292/1, 169.12, 169.14, 292/169.17, 348, 336.5; 151/41.73; 403/359, 282, 284, 24; 70/380

[56] References Cited

U.S. PATENT DOCUMENTS

| | | | |
|---|---|---|---|
| 1,715,996 | 6/1929 | Fekete | 292/169.12 |
| 1,782,386 | 11/1930 | Moore et al. | 292/348 X |
| 1,946,065 | 2/1934 | Dodge | 403/282 X |
| 2,948,558 | 8/1960 | Schultze | 74/522 X |
| 2,955,856 | 10/1960 | Dean | 403/282 |
| 3,078,754 | 2/1963 | DeLacy | 151/41.73 X |
| 3,100,333 | 8/1963 | Friend | 151/41.73 |
| 3,125,146 | 3/1964 | Rosan | 151/41.73 |

FOREIGN PATENT DOCUMENTS

| | | | |
|---|---|---|---|
| 102283 | 10/1937 | Australia | 292/348 |

OTHER PUBLICATIONS

"3 Quick Ways to Put Load-Bearing Threads in Thin Material . . . Permanently!", SPS, p. 74 of *Machine Design*, 7/20/61.

*Primary Examiner*—Rodney H. Bonck
*Attorney, Agent, or Firm*—Sughrue, Rothwell, Mion, Zinn and Macpeak

[57] ABSTRACT

A lock follower, particularly a handle or pressure follower, comprises a hub part consisting of a machined rod-like or tubular material and an arm part consisting of a punched sheet-metal material. The parts are rigidly joined together by flow of material from the arm part to a peripheral groove in the hub part. Preferably the hub part exhibits in the neighborhood of the groove a portion of smaller diameter than the main portion of the hub but of larger diameter than the hole for the hub part in the arm part. Said portion is pressed so far into the hole in the arm part while deforming the material defining the hole that the arm part abuts an abutment in the hub part. Further, the portion of the hub located between the peripheral groove and the abutment preferably has axially extending ridges around the periphery thereof to facilitate flow of material and rigidly securing the two parts together in both axial and circumferential direction.

The invention also concerns a method of manufacturing a lock follower from two parts of the above described kind.

2 Claims, 3 Drawing Figures

Figure 1:
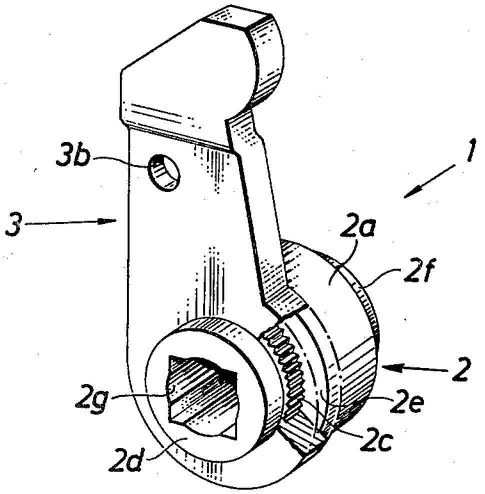

LOCK FOLLOWER, PARTICULARLY A HANDLE OR PRESSURE FOLLOWER, AND A METHOD OF MANUFACTURING THE SAME

The present invention relates to followers for locks, and particularly but not exclusively to handle or pressure followers.

Lock followers have previously been die cast as one piece structures. The follower comprises a solid hub with an arm projecting outwardly therefrom, the hub and arm having varying dimensions and shapes, depending upon the type of lock for which the follower is intended. Consequently, the die casting of followers is an expensive method of manufacture, because of the high outlay incurred by the required tools. In addition there is needed an extensive machining of the cast followers.

In U.S. Pat. Nos. 1,715,996, 2,369,873 and 2,470,771 there are described previously known followers comprising two main parts, i.e. one hub part and one arm part. In these followers one part is loosely inserted into or threaded onto the other part, i.e. the parts are not rigidly secured to each other. Such a follower lacks sufficient strength to cope with the torsional and axial strains which at use will be met by a follower of the kind here under concern. Therefore the said previously known followers are of no interest in the present context.

An object of the present invention is to provide a novel type of lock follower which can be manufactured automatically and in which both the hub part and the arm part can be given a varying shape and form whilst using relatively inexpensive tools.

A lock follower according to the invention comprises a hub part and an arm part having a through hole for receiving the hub part, and is mainly characterised in that the hub part consists of a machined rod-like or tubular material and the arm parts consists of a punched sheet-metal material, said parts being rigidly joined together by flow of material from the arm part to a peripheral groove in the hub part.

The two portions are joined together by a simple pressing operation, thereby enabling the follower to be manufactured in a much simpler manner .

It is previously known from the British Pat. No. 984,819 to provide hermetically sealed housing constructions instead of heat-sealed housing constructions for electro-mechanical and electronic use, by using two parts of mutually different hardness and plasticity, wherein the softer material is caused to flow into a groove disposed in the harder material. In this instance there is used a forward, laterally directed flange followed by a shoulder having the form of a compression ring on the part of harder material, said shoulder or abutment being adapted to be embedded in the end of the part of softer material. Consequently, in order to achieve the hermetic seal and heat-seal intended, this known arrangement requires the parts to have a comparatively complicated design.

According to the present invention, by means of which another type of joint is obtained between the hub part and the arm part, a housing to be hermetically sealed between the parts is lacking. Therefore said parts can be of much simpler design. The two parts may also comprise a material having the same, or substantially the same degree of hardness, although it is also possible, if desired, to make the parts of mutually different materials.

In practice it is preferred that the hub part, in the region of the groove, exhibits a portion of smaller diameter than the main portion of the hub, although with larger diameter than the through hole in the arm part, which portion is pressed so far into the hole in the arm part while deforming the material defining the hole that the arm part abuts an abutment in the hub part.

The arm part is, in this way, held axially locked to the hub part in an effective manner.

An effective locking of the two parts, both axially and circumferentially, can be obtained if, in accordance with a preferred embodiment of the invention, the part located between the groove and the abutment exhibits axially extending ridges distributed around the periphery.

In this embodiment the migration of materials from the arm part to the groove in the hub part takes place in a particularly simple and effective manner, owing to the fact that the axially extending ridges cut and press material out of the arm part, this material flowing into the groove. At the same time the two parts are reliably fixed together in a circumferential or tangential direction, i.e. in a direction in which the joint between the arm part and the hub part are subjected to the highest stresses, namely torsional stresses as a result of lever action at use.

The invention also relates to a method of manufacturing a lock follower of the aforedescribed type, the method comprising the steps of punching the arm part from a sheet-metal blank and providing it with a through hole for receiving the hub part; providing the hub part with a peripheral groove and pressing the two parts together in a manner such as to lock the parts together by means of flow of material from the arm part to the groove in the hub part.

Thus, it is possible to join the hub part and the arm part already before the arm part is completely punched out of the metal blank. This is of special advantage at manufacture of the follower in an automatic machine.

When applying the method according to the invention, the hub part, prior to being joined to the arm part, can be cut from a tubular or rod-like material of indefinite length.

When using rod-like material, the material, prior to being cut, may be provided, in a lathe, with an axial bore, circumferential grooves and axial ridges. The hub part is then cut from the material at the desired length.

When the hub part is manufactured from a tubular material, there is already provided a centre bore for the follower. In both cases it is comparatively easy to shape this bore into a rectangular hole, conveniently after joining the hub part to the arm part. Then the rectangular hole will be correctly positioned relative to the direction of the arm part. Still more exactness is obtained when according to an embodiment preferred in practice the rectangular hole in the hub part is punched already before the arm part is fully punched from the metal blank.

Figure 3:
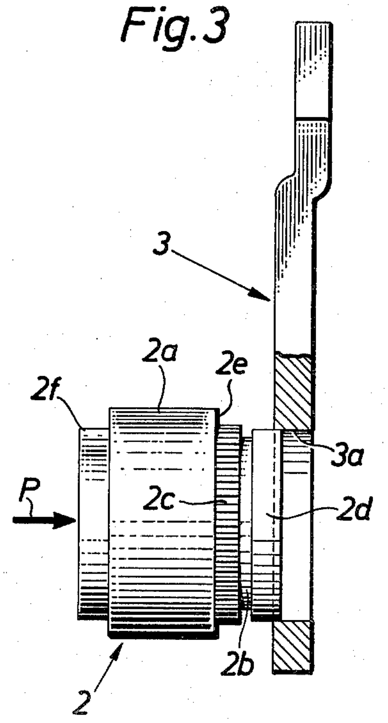
Figure 2:
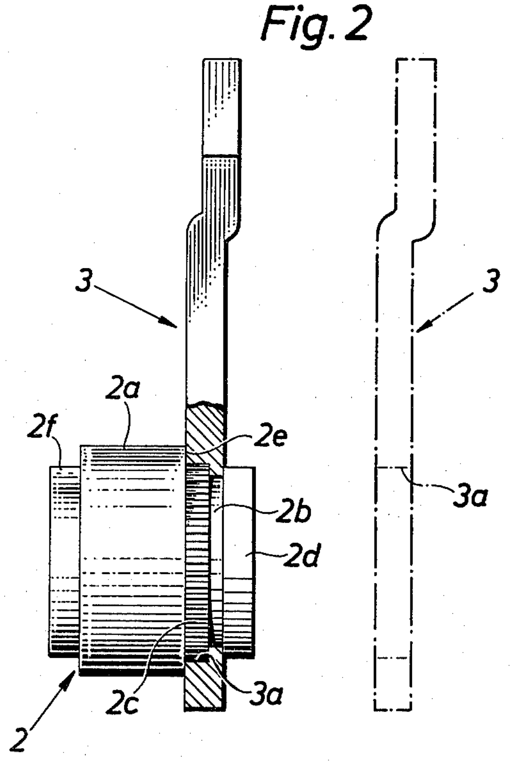

So that the invention will be more readily understood and further features thereof made apparent, an exemplary embodiment of the invention will now be described with reference to the accompanying schematic drawings, in which FIG. 1 is a perspective view of a follower according to the invention in which a portion of the arm part is cut away and removed for the sake of clarity, FIG. 2 is a partly cut away side view of the follower according to FIG. 1, and FIG. 3 illustrates the arm part threaded onto the hub part but before the two parts have been pressed together.

Referring to FIG. 1 there is illustrated a pressure follower 1 intended for a lock and comprising a hub part 2 manufactured from a tubular material, and an arm part 3 which has been punched from a sheet-metal blank.

The arm part 3 exhibits a circular bore 3*a* for receiving the hub part.

The hub part 2 has a cylindrical main portion 2*a* which merges, via an abutment 2*e*, with a serrated or axially ridged portion 2*c*. Adjacent the serrated portion 2*c* is a peripheral groove 2*b* which is bordered on the side thereof opposite said serrated portion 2*c* by a portion 2*d* which has a slightly smaller diameter than that of the serrated portion 2*c*. The diameter of the portion 2*d* corresponds—as is evident from FIG. 3—to the inner diameter of the through hole or bore 3*a* disposed in the arm part 3. At the other end the hub part exhibits a portion 2*f* which forms an abutment and which, similarly to the opposing end portion 2*d*, serves as a bearing means for the follower when this is in use.

The hub part 2 is joined to the arm part 3 by bringing the two parts together under pressure. In this connection, the arm part 3, as illustrated in chain lines in FIG. 2, may for instance initially be inserted over the hub part 2*d* which has the same diameter as the through hole 3*a* of said arm part. In this way, the two parts are accurately steered relative to one another. The two parts are then pressed together, whereupon the axial ridges on part 2*c* press material from the portion of the arm part defining the hole 3*a*, the material pressed out by said ridges flowing into the groove 2*b*. When one side of the arm part abuts the abutment 2*e* of the hub part, the hub part and arm part are accurately and positively fixed to one another both in an axial and a circumferential direction.

The hub part may be made from rod material which is provided in a lathe with a centre bore 2*g*, the bearing portions 2*f*, 2*d*, the serrated portion 2*c* and the groove 2*b*. The hub part can then be cut into the required length by means of the lathe tool.

When manufacturing the arm part, a strip of sheet-metal is fed into a punching tool and the through hole 3*a* and optionally also the smaller hole 3*b* is punched from the strip.

As before mentioned, the centre bore of the hub part is punched to a hole 2*g* of rectangular shape, optionally after the two parts have been joined together. Thereby the rectangular hole 2*g* obtains a correct position relative to the arm part.

At a modified method of manufacture suitable for manufacture in an automatic machine the hole 3*a* for the hub part is firstly punched in a metal blank (not shown). Thereafter the hub part is pressed into the hole, so that it is joined to the blank . Thereafter the rectangular hole 2*g* is punched in the hub part. When this has been done the arm part is punched from the metal blank. The arm part may possibly initially be partly punched from the blank but it has when the hub part is pressed thereonto some portions which are still being attached to the blank. The complete follower is then removed by means of a final punching operation.

We claim:

1. A lock follower, particularly a handle or pressure follower, comprising:

(a) an elongated arm member punched from sheet-metal material and having a circular hole through one end thereof initially of a first diameter, (b) a cylindrical hub member having a central, axial bore extending therethrough and including, in axial succession:

(1) a first bearing portion having a diameter substantially equal to said first diameter, (2) a recessed peripheral groove having a diameter less than said first diameter, (3) an axially toothed anchoring and displacement portion having a diameter greater than said first diameter, and (4) a main portion having a diameter greater than that of said anchoring and displacement portion to define an upstanding shoulder therebetween, (c) the thickness of the arm member proximate its through hole being substantially equal to the combined axial length of the groove and the anchoring and displacement protion, and (d) the arm and the hub member being press-fitted together with the arm abutting the shoulder of the main portion, the bearing portion extending out from the arm hole, and the sheet-metal material of the arm being flow displaced by the anchoring and displacement portion to surround its axial teeth and substantially fill the groove, thereby rigidly joining the arm and hub member together and preventing any relative axial or circumferential movement therebetween.

2. A lock follower as defined in claim 1, further comprising a second bearing portion extending outwardly from the end of the main portion opposite the anchoring and displacement portion, and having a diameter substantially equal to said first diameter.

* * * * *